United States Patent [19]

Walsh et al.

[11] Patent Number: 4,631,698
[45] Date of Patent: Dec. 23, 1986

[54] INTERFACE APPARATUS

[75] Inventors: Joseph F. Walsh; William P. Dean, both of King County, Wash.

[73] Assignee: IQ Technologies, Inc., Bellevue, Wash.

[21] Appl. No.: 518,404

[22] Filed: Jul. 29, 1983

[51] Int. Cl.[4] .................. G06F 13/42; H04B 17/00
[52] U.S. Cl. .................................. 364/900; 371/22; 340/825.16
[58] Field of Search ... 364/200 MS File, 900 MS File, 364/483; 340/825.01, 825.03, 825.05, 825.16; 371/11, 15, 16, 7, 22; 179/175.3 S, 175.3 R; 370/16, 24, 94, 61; 339/18 C, 18 P, 32 R, 32 M, 28, 29 R; 307/219, 475

[56] References Cited

U.S. PATENT DOCUMENTS

| 4,180,860 | 12/1970 | Driscoll | 364/900 |
|---|---|---|---|
| 4,264,894 | 4/1981 | Ellington | 179/175.3 R |
| 4,320,508 | 3/1982 | Takezoe | 371/22 |
| 4,417,320 | 11/1983 | Ei | 364/900 |
| 4,573,044 | 2/1986 | McConachie | 340/825.01 |
| 4,579,407 | 4/1986 | Shimada | 339/29 R |

Primary Examiner—James D. Thomas
Assistant Examiner—Florin Munteanu
Attorney, Agent, or Firm—Seed and Berry

[57] ABSTRACT

An interface apparatus for interconnecting signal lines of a computer connector and a peripheral device connector with non-matching interconnect patterns having mismatched data lines or open inputs on handshake or control lines. A pair of conductive paths extend between the connectors, with each path interconnecting one data line of the computer connector with one data line of the peripheral connector. Lights indicate mismatched interconnection of the data lines, and a switch selectively reverses the interconnection of the data lines. Additional conductive paths extend between the connectors, each path interconnecting at least one handshake or control line of each connector with at least one handshake or control line of the other connector. Two pairs of interconnecting handshake lines are each provided with a switch in gang with the data line switch for selectively reversing their electrical interconnection. Four current-regulating field-effect transistors are each connected between one of the handshake lines and a common node, and act as a conductor when an enable signal is present on its line and as a current-limiter when an open input is present on its line. Resistors are connected between the common node and each of the remaining handshake or control lines.

35 Claims, 20 Drawing Figures

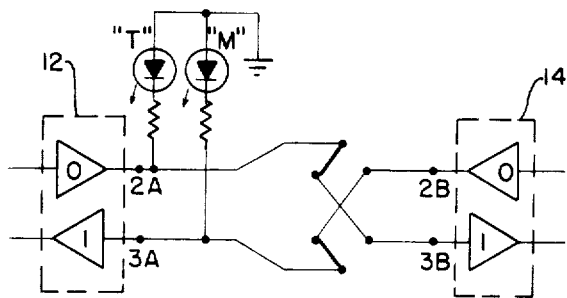
FIG. 6B
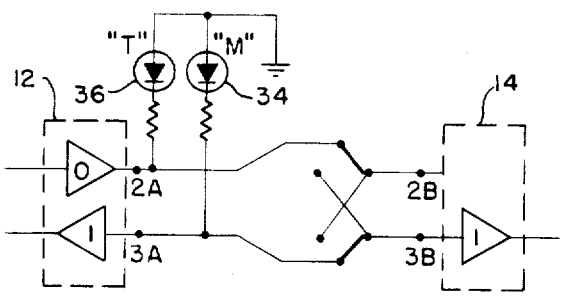
FIG. 7A
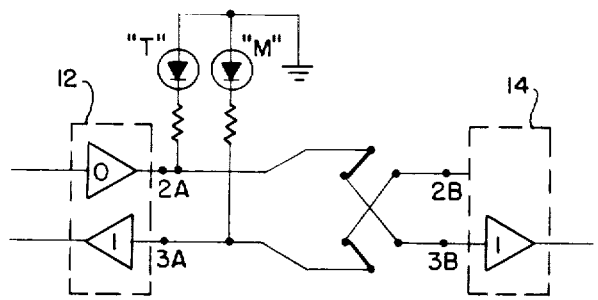
FIG. 7B
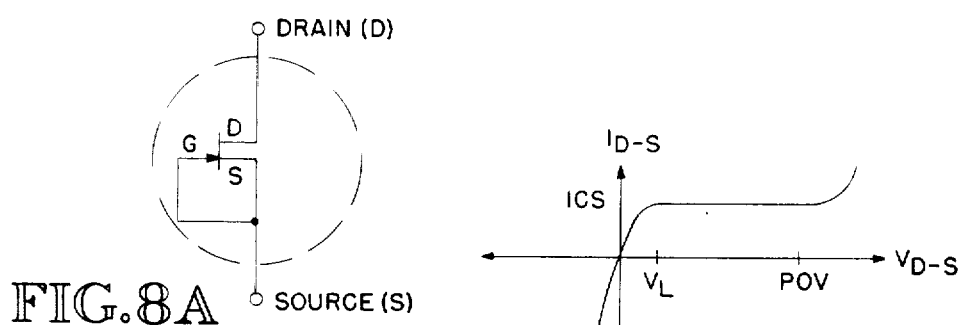
FIG. 8A
FIG. 8B
FIG. 8C

INTERFACE APPARATUS

TECHNICAL FIELD

The present invention relates generally to an interface apparatus, and more particularly, to an interface cable assembly which provides compatible signal connections between various computers and peripheral hardware devices without the need for custom cables.

BACKGROUND ART

A person purchasing or owning a computer made by one company, many times purchases a peripheral hardware device, such as a terminal, printer or modem, manufactured by another company. While certain industry connector standards to exist for pin assignments, such as the standard RS-232 recommended by the Electronic Industries Association, 2001 Eye Street, N.W., Washington, D.C. 20006 for the 25-pin connector being used for typical computer equipment, adherence is voluntary and the standard usually allows enough flexibility to the manufacturers that the signals provided or required on the various pins of the computer connector do not coincide exactly with the signals provided or required on the corresponding pins of the peripheral device connector. Frequently, a handshake or control signal required by the computer or peripheral device to operate will not even be provided. This means that the computer or the peripheral device will not operate if their connectors are connected directly together. The same problems are encountered when two computers or two peripheral devices are connected directly together.

In the past, the purchaser of a computer and a peripheral device with such nonmatching interconnect patterns often had to build himself, or contract for another to build, a custom or specialized interconnect cable to accomplish the proper interconnection of pins on the computer connector with the pins on the peripheral device connector so the equipment would operate together. Such specialized connect cables are expensive and time-consuming to build, especially when the manufacturer of the equipment involved does not adequately document the signals and signal requirements on the connectors used, as is frequently the case. Some manufacturers provide little, if any, such documentation; and with new models of equipment, manufacturers often take months to publish documentation with the necessary data. Additionally, manufacturers often change the interface patterns of equipment for subsequent production runs without notice or documentation.

Without an accurate specification giving the signals on particular connector pins or a schematic diagram for both the computer and peripheral device, the person building the interconnect cable must probe and search for pins that relate to each signal, and test and guess to determine which pin of the computer connector must be hard-wired through the cable to which pin of the peripheral device connector. This is a tedious trial-and-error process that requires much time, skill and good luck. A typical specialized cable may take hours or even days to complete. This process is frequently going on at the same time the equipment owner is attempting to run and debug newly purchased equipment or software which may not be operating because of problems other than incompatible connectors, making the job very difficult. The procedure typically involves soldering or otherwise connecting cable wires between various pins of the interconnect cable connectors, or use of a breakout box with jumper leads and multiple multipole switches to determine and test the proper cable configuration. As mentioned above, if either the computer or peripheral device does not supply a signal required by the other device, this must be determined and the signal generated to make the equipment operate together.

For a few of the more popular computers and peripheral devices, the necessary interconnect cables are manufactured in advance and available for purchase, but the combinations of equipment for which such prefabricated cables are available are extremely limited, the supplies are often scarce, and not all sellers of computers and peripheral devices stock the needed cables. The prefabricated cables are relatively few in number compared to the number of equipment combinations possible with incompatible connectors, a result of the fact that numerous computers and peripheral devices exist which are manufactured by many different manufacturers. Almost each combination of equipment will require a different specialized interconnect cable. Of course, once a specialized cable is purchased or built for a particular computer and peripheral device, it has the further disadvantage of not being usable with another peripheral device the computer user may purchase in the future, thus requiring another specialized cable.

It will therefore be appreciated that there has been a significant need for a relatively inexpensive and easy to use interface cable assembly which will quickly and properly interconnect most computers and peripheral devices with nonmatching interconnect patterns without requiring knowledge of the particular pin or signal configuration of either the computer or peripheral device. Preferably, the interface cable assembly should not require external power to operate, should provide any missing and necessary handshake or control signals, should provide means for determining whether the particular computer and peripheral device to which it is connected is in a data transmit and receive mode, and should provide means to assist the user in setting the various switches and parameters of the computer and peripheral device to make the equipment function when properly interconnected. The present invention fulfills this need, and further provides other related advantages.

DISCLOSURE OF INVENTION

The present invention resides in an interface apparatus for interconnecting computers and peripheral devices with external connectors having mismatched data signal lines or open inputs on handshake or control signal lines. Basically, and in general terms, the apparatus of the invention includes means for electrically interconnecting a pair of designated data signal lines of a first computer or peripheral device connector with a pair of designated data signal lines of a second computer or peripheral device connector, detection means for detecting mismatching of the data signal lines, switching means for selectively reversing the electrical interconnection of the data signal lines, and enabling means responsive to an enable signal on at least one handshake signal line of the computer or peripheral device connector for supplying the enable signal to one or more other handshake or control signal lines having an open input.

More specifically, in the presently preferred embodiment of the invention, the means for electrically interconnecting a pair of designated data signal lines comprises a pair of conductive paths extending between a first connector for electrical connection with the signal lines of the first computer or peripheral device connector and a second connector for electrical connection with the signal lines of the second computer or peripheral device connector. Each of the paths electrically interconnects one designated data signal line of the one connector with one designated data signal of the other connector. A detector is provided for detecting and indicating the mismatching and a switch is provided for selectively reversing the electrical interconnection of the data signal lines by altering the pair of conductive paths when a mismatching is detected.

The preferred embodiment of the invention further includes means for electrically interconnecting a plurality of designated handshake and control signal lines of the first connector with a plurality of designated handshake and control signal lines of the second connector. The enabling means is responsive to an enable signal on any one of a predetermined number of the handshake signal lines, and includes a plurality of control means for supplying a current limited enable signal to any others of the predetermined number of interconnected handshake signal lines, with a current drain on the enable signal being substantially insensitive to variations in the voltage of the enable signal. The control means has at least two operative states, in a first state being operative as a conductor of the enable signal if connected to one of the predetermined number of handshake lines with an enable signal, and in a second state being operative as a current limiter if connected to one of the predetermined number of handshake signal lines with an open input. In such manner, an enable signal on one of the predetermined number of handshake signal lines is conducted by its respective control means through the respective control means of another of the handshake signal lines with an open input with a limited current drain on the enable signal.

In the presently preferred embodiment of the invention, the control means includes current-regulating field-effect transistors connected between a common node and one of the predetermined number of the interconnected handshake signal lines. The transistor is biased when an enable signal is present on one of its respective handshake signal lines for operation as a diode, and biased for operation as a constant current source when an open input is present on one of its respective handshake signal lines.

The preferred embodiment of the invention further includes a plurality of resistive conductors, each electrically interconnecting at least one of the interconnected control or handshake signal lines with at least one of the control means for conducting the enable signal. More specifically, the resistive conductors each electrically interconnect one of the conductive paths interconnecting a handshake or control signal line of the first connector and a handshake or control signal line of the second device connector with the common node.

Also included is a switch for selectively reversing the electrical interconnection of a first pair of designated handshake signal lines of the computer connector with a corresponding second pair of designated handshake signal lines of the peripheral device connector by altering the conductive paths interconnecting the pairs of handshake signal lines. The switch reverses the interconnection of the handshake signal lines in response to the switch for reversing interconnection of the data signal lines. Further included are indicator means for sensing and indicating the presence of an enable signal on at least one of a predetermined number of the interconnected handshake signal lines. In an alternative embodiment, indicator means are provided for sensing and indicating the presence of a disable signal on at least one of the predetermined number of handshake signal lines.

Other features and advantages of the invention will become apparent from the following detailed description, taken in conjunction with the accompanying drawings.

BRIEF DESCRIPTION OF THE DRAWINGS

FIG. 6B is the schematic diagram of FIG. 6A, with the apparatus providing compatible signal connections;

FIG. 7A is the schematic diagram of FIG. 5 showing another arrangement of incompatible signal connections;

FIG. 7B is the schematic diagram of FIG. 7A, with the apparatus providing compatible signal connections;

FIG. 8A is a schematic drawing showing a current-regulating field-effect transistor of the type used in the present invention;

FIG. 8B shows the voltage-current characteristics of the current regulating field-effect transistor of FIG. 8A;

FIG. 8C is an equivalent schematic drawing of the current-regulating field-effect transistor of FIG. 8A;

BEST MODE FOR CARRYING OUT THE INVENTION

Figure 1:
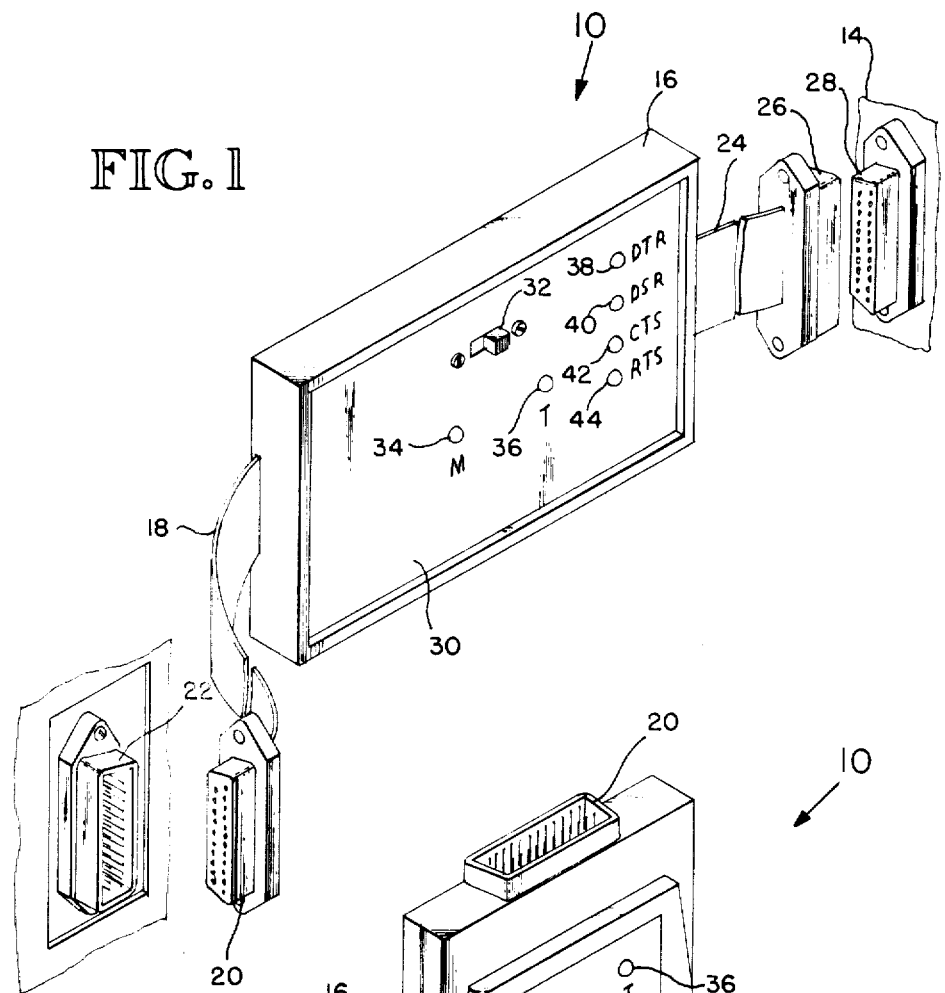
FIG. 1 is an isometric view of an interface cable assembly embodying the present invention.

As shown in the drawings for purposes of illustration, the present invention is embodied in an interface cable assembly, indicated generally by reference numeral 10, for interconnecting a computer 12 and a peripheral hardware device 14, the computer and peripheral device being shown in the drawings only by their respective external connectors. It is to be understood that the interface cable assembly 10 may also be used to interconnect two computers, or to interconnect two peripheral devices. The assembly 10 is described herein for a 25-pin connector using typical pin assignments under recommended standard RS-232 of the Electronic Industries Association; however, the invention of the present application is not limited to 25-pin connectors or standard RS-232 connectors, and may be utilized to interface computers and peripheral devices using other size connectors and pin arrangements.

A first embodiment of the invention, shown in FIG. 1, includes a case 16, a first ribbon cable 18 with a first connector 20 attached thereto for connection with an external connector 22 of the computer 12, a second ribbon cable 24 with a second connector 26 attached thereto for connection with an external connector 28 of the peripheral device 14. A face plate 30 of the case 16 supports a slide switch 32, two data transfer indicator lights 34 and 36, identified as "M" and "T", respectively, and four status indicator lights 38, 40, 42 and 44, identified as "DTR", "DSR", "CTS" and "RTS", respectively.

Figure 2:
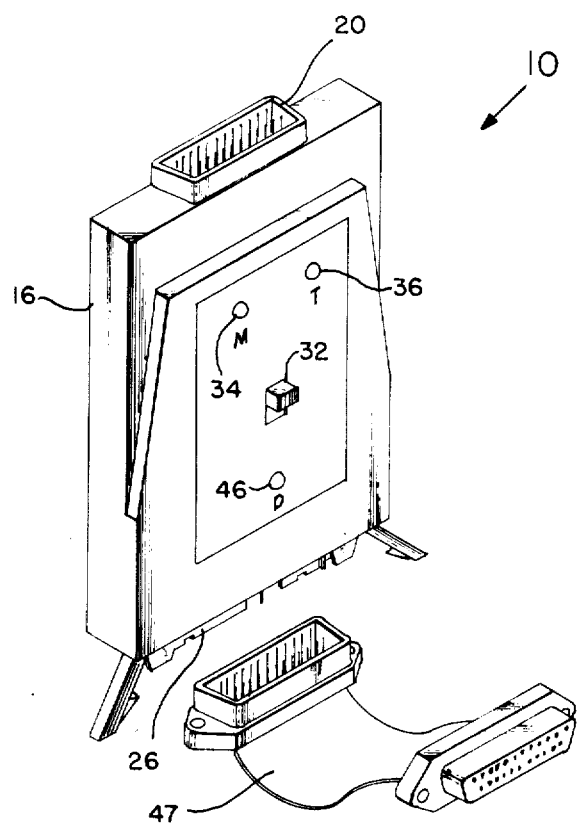
FIG. 2 is an alternative embodiment of an interface cable assembly shown in FIG. 1.

A second embodiment of the invention, shown in FIG. 2, similarly includes a case 16, a first connector 20, a second connector 26, a slide switch 32, and the "M" and "T" indicator lights 34 and 36. In the second embodiment, the connectors 20 and 26 are attached directly to the case 16 without ribbon cable, and a single status indicator light 46, identified as "D", is used instead of the four indicator lights 38–44. A separate ribbon cable 47 may be used to connect the interface cable assembly 10 to the computer 12 or the peripheral device 14.

Figure 3:
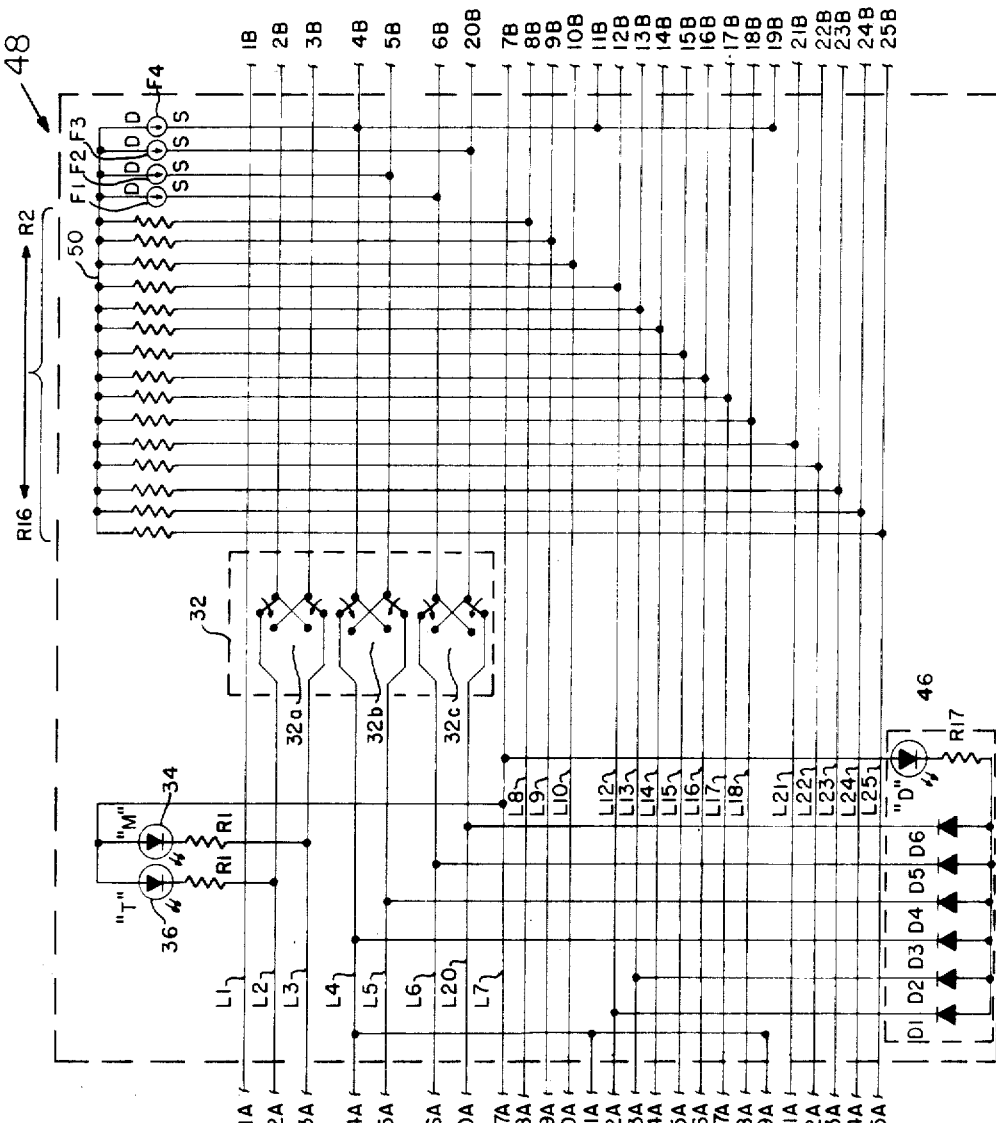
FIG. 3 is a schematic diagram of the circuitry of the apparatus of FIGS. 1 and 2, shown using the indicator lights of FIG. 2.

The case 16 contains within it electronic circuitry, indicated generally by reference numeral 48, and shown in FIG. 3 for the second embodiment of the invention. Except for the difference of status indicator lights and related components, the first and second embodiments use the same circuitry 48. As previously noted, the present embodiments of the invention will be described for a 25-pin standard RS232 connector of the type commonly used for computers and peripheral devices. The first and second connectors 20 and 26 mate with the computer and peripheral device connectors 22 and 28, respectively, and electrically connect the signal lines numbered 1A through 25A of the computer connector, and the signal lines numbered 1B through 25B of the peripheral device connector, to the circuitry 48. The numbering of the signal lines reflects the assigned connector pin numbers corresponding to the lines. While for purposes of description the computer connector 22 is shown and described connected to the first connector 20, and the peripheral device connector 28 is shown and described connected to the second connector 26, the interface cable assembly 10 functions equally well with the connector connections reversed. In some instances, it may be desirable to tailor an interface cable assembly 10 to a particular piece of equipment, usually a popular computer, and provide specialized connectors by which the assembly may be connected to other computers or to peripheral equipment. Certain modifications to the circuitry 48 may also be made tailoring the assembly 10 to that particular piece of equipment.

The circuitry 48 includes a plurality of conductive paths L1–L25 electrically interconnecting particular signal lines of the computer connector 22 with the particular signal lines of the peripheral device connector 28, with the switch 32 selectively altering certain of the paths for reversing the interconnection of preselected pairs of the signal lines. In particular, as shown in FIG. 3, the computer signal line 1A is connected directly to the peripheral device signal line 1B by the conductive path L1, and similarly the computer signal lines 7A–10A, 12A–18A, and 21A–25A are connected directly to the peripheral device signal lines 7B–10B, 12B–18B, and 21B–25B, respectively, by the paths L7–L10, L12–L18, and L21–L25, respectively. The computer signal lines 4A, 11A and 19A are interconnected, and the peripheral device signal lines 4B, 11B and 19B are likewise interconnected. The path L4 connects these two groups of signal lines together through the switch 32, as will be described below. While other schemes may be used to interconnect these various signal lines, the presently preferred interconnections have been described.

In most standard RS-232 25-pin connectors, signal lines 2 and 3 are designated as data signal lines; however, certain manufacturers of computers and peripheral devices utilize signal line 2 as an input data line and signal line 3 as an output data line, while other manufacturers utilize signal lines 2 and 3 in a reverse manner. Consequently, connecting together a computer and a peripheral device each using the same signal line as an input or an output data line will result in nonmatching interconnect patterns. For such a situation, the slide switch 32 includes a first double-pole, double-throw switch 32a positioned along the pair of conductive paths L2 and L3 connecting the computer signal lines 2A and 3A to the peripheral device signal lines 2B and 3B for selectively reversing the interconnection of computer signal lines to the peripheral device signal lines by altering the paths L2 and L3. Several possible combinations of compatible and mismatched input and output data lines are illustrated in FIGS. 5, 6A, 6B, 7A and 7B, showing in schematic form input line receivers, indicated by the letter "I", and output line drivers, indicated by the letter "O", of the computer 12 and peripheral device 14 attached to the signal lines 2A, 2B, 3A and 3B. It is to be understood that these line receivers and drivers are part of the internal circuitry of the computer 12 and peripheral device 14, and form no part of the present invention.

Figure 5:
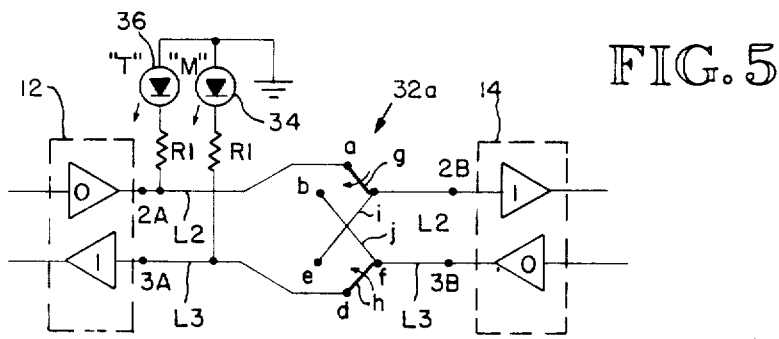
FIG. 5 is a schematic diagram of a portion of the apparatus shown in FIG. 3 with compatible signal connections between computer and peripheral device connectors.

As best shown in FIG. 5, the first switch 32a has six switch terminals a–f and two contact arms g and h. The contact arm g may be manually thrown to selectively produce an electrical connection between either terminals a and c, or a and b. The contact arm h moves simultaneously with contact arm g to selectively produce an electrical connection between either terminals d and f, or d and e. With the first switch 32a positioned as shown in FIG. 5, the conductive path L2 extends between the switch terminal a and the computer signal line 2A, and extends between the switch terminal c and the peripheral device signal line 2B. The conductive path L3 extends between the switch terminal d and the computer signal line 3A, and extends between the switch terminal f and the peripheral device signal line 3B. Crossover connectors i and j connect together switch terminals c and e, and b and f, respectively. Also shown in FIG. 5 are the "M" and "T" indicators lights 34 and 36, each comprising a light-emitting diode. Each diode is connected by its anode to an internal ground which is present on most RS-232 connectors on the signal line 7, and connected by its cathode through a resistor R1 to one or the other of the computer signal lines 2A or 3A.

In FIG. 5, compatible input and output data lines are shown with an output line driver "O" on the computer signal line 2A and an input line receiver "I" on the peripheral device signal line 2B, and an output line driver "O" on the peripheral device signal line 3B and an input line receiver "I" on the computer signal line 3A. The first switch 32a is thrown so contact arms g and h are positioned to provide unaltered conductive paths L2 and L3 between the computer and peripheral device signal lines. For purposes of illustration, the present embodiment of the invention is described interconnecting a computer and a peripheral device using line receivers and drivers which, when not driven, have between ±3 volts on their input (generally referred to for convenience as a "zero voltage") and a negative voltage on their output. To facilitate the description, the negative voltage will be assumed to be −15 volts in magnitude, but typically ranges between −5 to −15 volts.

The interconnection of the data signal lines of the computer 12 and the peripheral device 14 is compatible when the first switch 32a is positioned as shown in FIG. 5. This condition is indicated by the illumination of both of the "M" and "T" indicator lights 34 and 36 prior to the transmission of data, as will now be explained. The path L2 has connected to it the output of the computer output driver "O" on the signal line 2A, which is at −15 volts, and the input of the peripheral device input receiver "I" on signal line 2B, which is at zero volts. Since the negative output voltage is controlling, the path L2 is held at about −15 volts. This negative voltage causes conduction of current through the light-emitting diode comprising the "T" light 36 and its illumination. The "M" light 34 is similarly illuminated by the path L3 being held at a negative voltage by the output of the peripheral device output driver "O" on the signal line 3B.

It is noted that if the first switch 32a happened to be its alternate position, connecting together the outputs of the computer output driver "O" on the signal line 2A and the peripheral device output driver "O" on the signal line 3B, and connecting together the inputs of the computer input receiver "I" on the signal line 3A and the peripheral device input receiver "I" on the signal line 3B, the interconnection of the data signal lines would be incompatible. This condition would be indicated by the "M" light 34 not being illuminated. With the inputs of both of the input receivers being so connected together, a zero voltage would be applied to the cathode of the light-emitting diode comprising the "M" light 34, thus resulting in no current being conducted therethrough and inhibiting of the light. The "T" light 36 would, however, still be illuminated, since the connected together outputs of both of the output drivers would be at −15 volts. The operation of the "M" and "T" lights 34 and 36 would, of course, be reverse if the input receivers and output drivers were compatibly connected for data flow on the data signal lines in directions opposite those shown in FIG. 5. In any event, when one of the "M" or "T" lights 34 or 36 is not illuminated, it is a signal to the user to change the position of the first switch 32a, and simultaneous illumination of both lights signals the user that compatible connection of the data signal lines exists.

Figure 6A:
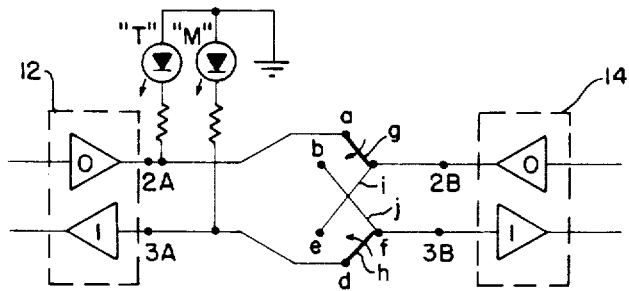
FIG. 6A is the schematic diagram of FIG. 5 showing incompatible signal connections between the computer and peripheral device connectors.

Operation of the interface cable assembly 10 with incompatible, mismatched data signal lines is illustrated in FIGS. 6A and 6B. In FIG. 6A, the situation is much as described for FIG. 5 above when the switch 32a is in its alternate position. The inputs of the computer input receiver "I" on the signal line 3A and the peripheral device input receiver "I" on the signal line 3B are connected together and apply a zero voltage to the cathode of the light-emitting diode comprising the "M" light 34, inhibiting illumination of the "M" light. This signals the user to change the position of the first switch 32a. As discussed above, the outputs of the computer output driver "O" on the signal line 2A and the peripheral device output driver "O" on the signal line 2B are connected together.

The interconnection of the data signal lines is shown in FIG. 6B after the position of the first switch 32a has been changed. When the first switch 32a is thrown, the paths L2 and L3 are altered to properly connect together the output of the computer output driver "O" on the signal line 2A and the input of the peripheral device input receiver "I" on the signal line 3B and connect together the output of the peripheral device output driver "O" on the signal line 2B and the input of the computer input receiver "I" on the signal line 3A. With such an interconnection, both the "M" and the "T" indicator lights 34 and 36 are illuminated and the data signal lines are arranged for two-way data flow.

Another instance of incompatible, mismatched data signal lines is illustrated in FIG. 7A, with the peripheral device 14 having an input receiver on the signal line 3B but with no output buffer (a condition where the peripheral device only receives data), and the computer 12 having an output driver "O" on the signal line 2A and an input receiver "I" on the signal line 3A. With such a mismatching, the inputs of the computer input receiver "I" on the signal line 3A and the peripheral device input receiver "I" on the signal line 3B are connected together, inhibiting illumination of the "M" light. The "T" light 36 will be illuminated by the negative voltage applied by the output of the computer output driver "O" on the signal line 2A. When the first switch 32a is thrown, as shown in FIG. 7B, the paths L2 and L3 are altered to provide a compatible interconnection of the data signal lines. It is noted that the "T" light 36 will remain illuminated, but the "M" light 34 will still not be illuminated even though the signal lines are properly interconnected. The fact that one of the "M" and "T" lights 34 and 36 is not illuminated when the first switch 32A is in either of its positions is a signal to the user to try transmitting data over the data lines first with the switch in one position, then in the other, and to leave the switch in the position where data is transmitted even if it is garbled. That any data is transmitted indicates proper data signal line interconnection has been achieved. The fact that the data is garbled may be the result of some other system problem.

It has been learned through study that when the data signal lines of a computer and a peripheral device are incompatible (i.e., having nonmatching interconnect patterns) and must be reversed, as described above, the same incompatibility will exist as to certain pairs of handshake signal lines. In particular, for most standard RS-232 25-pin connectors, the pairs of handshake lines which likely also require reversal are the signal lines 4 and 5 usually designated as the RTS (request to send) and CTS (clear to send) handshake lines, and the signal lines 6 and 20 usually designated as the DSR (data set ready) and DTR (data terminal ready) handshake lines. As with the data signal lines, if the interconnection of these handshake lines are mismatched operation is impaired or prevented. To reverse the interconnection of these computer and peripheral device handshake signal lines, the slide switch 32 includes second and third double-pole, double-throw switches 32b and 32c, respectively, which are in a gang with the first switch 32a for simultaneous operation therewith. Alternatively, the switches 32a, 32b and 32c may be individually operated by the user.

The second and third switches 32b and 32c each have the same configuration of six terminals a–f, two contact arms g and h, and crossover connectors i and j as does the previously described first switch 32a. The second switch 32b is positioned along the pair of conductive paths L4 and L5 connecting the computer signal lines 4A and 5A to the peripheral device signal lines 4B and 5B for selectively reversing the interconnection of the computer signal lines to the peripheral device signal lines by altering the paths. Similarly, the third switch 32c is positioned along the pair of conductive paths L6 and L20 connecting the computer signal lines 6A and 20A to the peripheral device signal lines 6B and 20B for selectively reversing the interconnection of the computer signal lines to the peripheral device signal lines by altering the paths.

In order to solve the problem of incompatible computer and peripheral device connectors encountered with most RS-232 25-pair connectors resulting from open inputs on handshake and control signal lines, the circuitry 48 of the presently preferred embodiment of the present invention shown in FIG. 3 includes four current regulating field-effect transistors or FET F1–F4 and fifteen resistors R2–R16. The drain of each FET F1–F4, indicated by the letter "D", is connected to a common node or bus line 50, and the source of each FET, indicated by the letter "S", is connected to one of the four handshake signal lines. More particularly, the sources of the FETs F1–F4 are connected to the peripheral device signal lines 6B, 5B, 20B and 4B, respectively. Each of the resistors R2–R16 is connected between the common node 50 and one of the peripheral device signal lines 8B–10B, 12B–18B and 21B–25B, respectively. As previously mentioned, the signal lines 1B–25B are only described herein for purposes of convenience as the peripheral device signal lines since the second connector 26 is shown connected to the peripheral device connector 28, and the embodiment of the interface cable assembly 10 described herein functions equally well with the second connector connected to the computer connector 22 (in which case the signal lines 1B–25B would be described as the computer signal lines).

A schematic drawing is shown in FIG. 8A of a current-regulating field-effect transistor of the n-channel JFET type being used in the presently preferred embodiment of the invention. The drain (D) of the field-effect transistor connects to the external drain "D", and the gate (G) and source (S) are internally connected together and connect to the external source "S". The FET is manufactured by Siliconix, Incorporated, Post Office Box 4777, Santa Clara, Calif. 95054, under part number J506.

The voltage-current characteristics of the current regulating FET are shown in FIG. 8B. When a positive drain to source bias voltage ($V_{D-S}$) having a value between the peak operating voltage (Pov) and the limiting voltage ($V_L$) is applied to the drain "D" relative to the source "S", the FET has the characteristic of a constant current source or current limiter and conducts a drain to source current ($I_{D-S}$) having a limited current ($I_{CS}$). When the drain to source bias voltage ($V_{D-S}$) is reversed and a more positive voltage is applied to the source "S" relative to the drain "D", the FET has the characteristic of a foward-biased semiconductor junction or diode. An equivalent schematic representation of the FET is illustrated in FIG. 8C showing the FET as a current source for the instances when the drain "D" is biased positive relative to the source "S", and as a diode for the instances when the bias is reversed. It is noted that the current-regulating FETS may be replaced with any other component or combination of components demonstrating similar characteristics, including a current source which conducts when biased in one direction in response to the signals on the signal lines, and is bridged by an external diode for conduction in the other direction.

Several possible combinations of open inputs on handshake and control signal lines are illustrated in FIGS. 9A, 9B, 10A, 10B, 11A, 11B, 12A and 12B, and serve to demonstrate the operation of the present embodiments of the invention. Again, line receivers and drivers of the computer 12 and peripheral device 14 are shown attached to the signal lines. Except as otherwise noted, for ease of explanation the operation of the circuitry 48 will be described assuming there are no mismatched signal lines; however, the circuitry which will now be described would function equally well if mismatching had existed but was corrected by proper positioning of the switch 32, as described above.

Figure 9A:
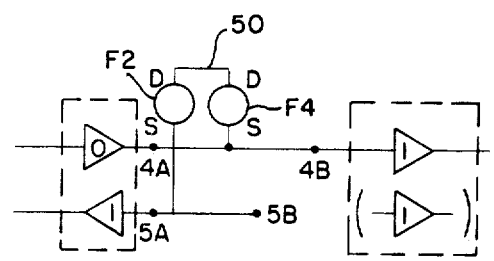
FIG. 9A is the schematic diagram of FIG. 5 showing incompatible signal connections with an open input line.

In FIG. 9A, two handshake signal lines are shown with an open input on the peripheral device signal line 5B. If an enable signal must be present driving the computer input receiver "I" on the signal line 5A, the computer and peripheral device 14 will not function together. As will now be described, the circuitry 48 of the present invention will automatically supply the missing and necessary enable signal to the computer input receiver without relying on any external power or access to any internal power supply of the computer or peripheral device, without relying on any external signals to the interface cable assembly 10, without requiring user adjustments, and without the user being required to know which, if any, signal lines have open inputs.

For purposes of illustration, the present embodiment of the invention is described with the output line drivers having a positive or high voltage on their output when driven to provide an enable signal. To facilitate the description, the positive voltage will be assumed to be +15 volts in magnitude. To aid in understanding of the operation of the interface cable assembly 10, it will be first described with respect to only two handshake signal lines having current-regulating FETs, with an enable signal present on one line, particularly computer signal line 4A.

Figure 9B:
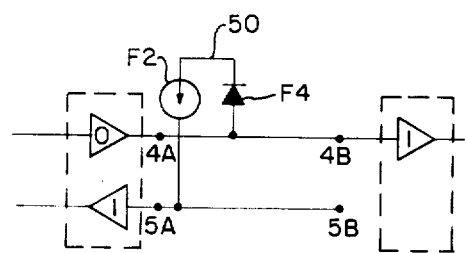
FIG. 9B is an equivalent circuit diagram showing operation of the apparatus shown in FIG. 9A.

With an open input on the peripheral device signal line 5B, as shown in FIG. 9A, the input of the computer input receiver "I" on the signal line 5A will be initially at zero volts since it is in an undriven condition. With the output of the computer output driver "O" on the signal line 4A providing an enable signal at +15 volts, the FET F4 is biased for operation as a diode and the FET F2 is biased for operation as a current source. Consequently, the FET F4 demonstrates the characteristics of a forward-biased semiconductor junction and the FET F2 demonstrates the characteristics of a constant current source, thereby conducting current from the FET F4 through the common node 50 to the FET F2, and supplying the enable signal on the signal line 4A to the signal line 5A. The equivalent circuit is illustrated in FIG. 9B and schematically shows the FET F4 as being the equivalent of a semiconductor diode and the FET F2 as being the equivalent of a current source. The enable signal supplied to the signal line 5A is limited in current as a result of the current limiter characteristics of the FET F2.

It is noted that the interface cable assembly 10 will also function to supply the missing enable signal even if the incompatibility included a peripheral device input receiver "I" (shown in parentheses in FIG. 9A) being connected to signal line 5B by its input. In this situation, which is much like having two open inputs, the enable signal on the signal line 4A would be supplied to both the computer input receiver "I" on the signal line 5A and the peripheral device input receiver "I" on the signal line 5B.

Figure 10A:
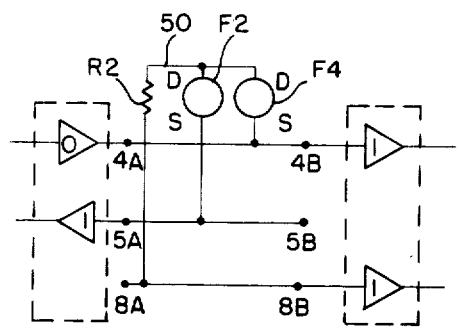
FIG. 10A is the schematic diagram of FIG. 5 showing an additional signal line, with open inputs on two lines.

In FIG. 10A, the same two handshake signal lines 4 and 5 are shown as in FIG. 9A with an open input on the peripheral device signal line 5B. Also shown with an open input is the computer signal line 8A, which may be a control signal line or yet another handshake signal line. The peripheral device signal line 8B is connected to the common node 50 by the resister R2. As discussed above for the computer signal line 5A, if, for operation of the peripheral device 14, an enable signal must be present on the signal line 8B driving the peripheral device input receiver "I" on the signal line 8B, the computer and peripheral device will not function together.

Figure 10B:
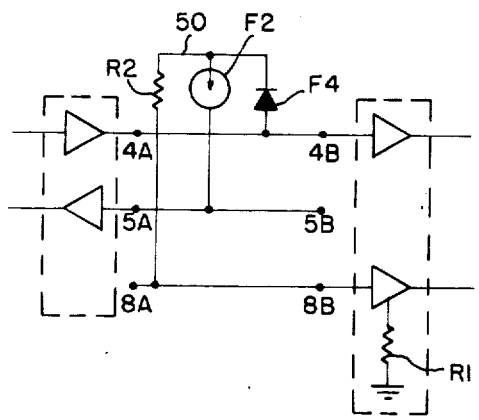
FIG. 10B is an equivalent circuit diagram showing operation of the apparatus of FIG. 10A.

As described above for FIGS. 9A and 9B, the input of the computer input receiver "I" on the signal line 5A will be initially at zero volts, and with an enable signal present, the output of the computer output driver "O" on the signal line 4A will be at +15 volts. The input of the peripheral device input receiver "I" on the signal line 8B will also be initially at zero volts, resulting in the FET F4 being biased for operation as a diode and the FET F2 being biased for operation as a current source (as discussed with respect to FIGS. 9A and 9B). Thus, the enable signal will be supplied not only to the signal line 5A, but also to the signal line 8B through the resistor R2. Since the peripheral device input receiver "I" on the signal line 8B has an internal input resistance, representatively shown as resistor $R_I$, a voltage divider is formed between the resistors R2 and $R_I$. The input resistance of the driver is relatively large, so the enable signal provides a sufficient voltage drop across the resistor $R_I$ to pull the input high and trigger the driver. The equivalent circuit is illustrated in FIG. 10B. It is noted that the resistors R2-R16 can be replaced with current-regulating FETs, which, as described below, would provide a better drive voltage. Resistors, however, are more economical to use for signal lines that are not often required to be supplied with an enable signal.

Figure 11A:
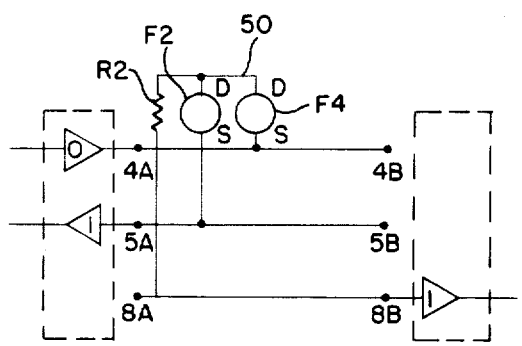
FIG. 11A is the schematic diagram of FIG. 10A with open inputs on three signal lines.

Another type of electrically incompatible input or output arrangement similar to that of FIG. 10A is shown in FIG. 11A. In this case, however, there are not only open inputs on the signal lines 5B and 8A, but there is no peripheral device output driver on the signal line 4B. This typically occurs where the computer manufacturer puts a certain handshake signal on one computer signal line, such as 4A, while the peripheral device manufacturer requires that the same signal be on a different peripheral device signal line, such as 16B.

Figure 11B:
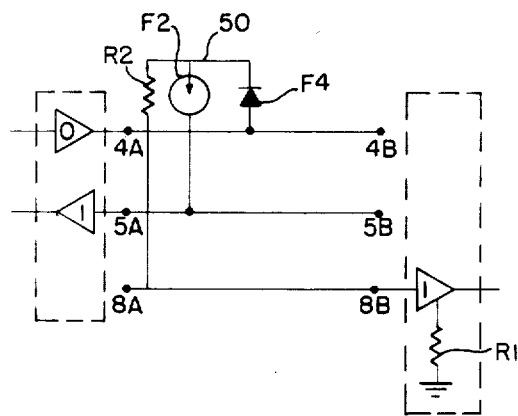
FIG. 11B is an equivalent circuit diagram showing operation of the apparatus of FIG. 11A.

With the arrangement of FIG. 11A, the output of the computer output driver "O" on the signal line 4A provides an enable signal at +15 volts, and the input of the computer input receiver "I" on the signal line 5A and the input of the peripheral device input receiver "I" on signal line 8B will be initially at zero volts. Thus, the FET F4 is biased for operation as a diode and the FET F2 is biased for operation as a current source; and the enable signal is supplied to the signal line 5A via the FET F2 and to signal line 8B via the resistor R2, much as described above for FIG. 10A. The equivalent circuit is illustrated in FIG. 11B.

Figure 12A:
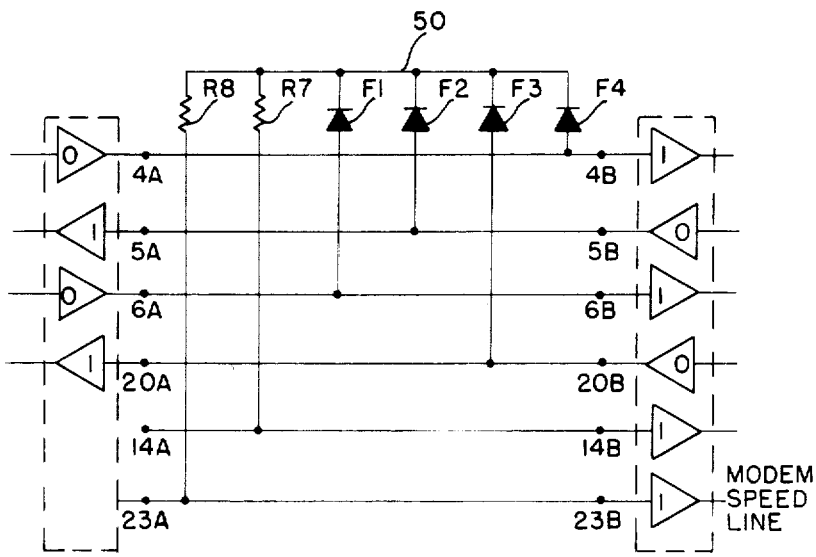
FIG. 12A is an equivalent circuit diagram showing operation of the apparatus of the present invention with open inputs on two signal lines and enable signals on four signal lines.

It is noted that if the current drain on the enable signal provided by the computer output driver "O" on signal line 4A as a result of supplying the enable signal to other signal lines is large, the voltage of the signal might be drawn down too low to activate the input line receivers. This problem is, however, substantially eliminated as to those signal lines using current regulating FETs due to the current limiter characteristics of the diodes when biased for operation as a current source, as described above for FET F2. With the current-regulating FETs used in the presently preferred embodiment of the invention, the current drain is limited to approximately two milliampheres for each FET biased for operation as a current source. The current limiter characteristic of current-regulating FETs helps prevent overloading the output line drivers supplying the enable signal to other signal lines. Another benefit which will be discussed below with respect to FIG. 12A is realized if, at any one moment, an enable signal is present on more than one handshake signal line using a current-regulating FET, since the current available to supply an enable signal to signal lines with open inputs is increased. While the preferred embodiment of the invention described herein has current-regulating FETs on four handshake signal lines and resistors on fifteen signal lines, it is to be understood that the particular number of signal lines using FETs and resistors may be increased or decreased.

In FIG. 12A, an equivalent circuit is illustrated with an enable signal present on all four handshake signal lines corresponding to the four current-regulating FETs F1-F4. The four FETs F1-F4 are each biased for operation as diodes and supply an enable signal to the peripheral device signal line 14A with an open input through the resistor R7 and to the peripheral device signal line 23A with an open input through the resistor R8. It is noted that if the signal line 23B is connected to a modem speed line with two data transmission rates, and if the computer 12 does not provide a data speed control signal (a situation frequently encountered), the interface cable assembly 10 will automatically provide an enable signal (high signal) to the signal line 23B, which indicates the high-speed transmission rate at which much equipment operates.

Figure 12B:
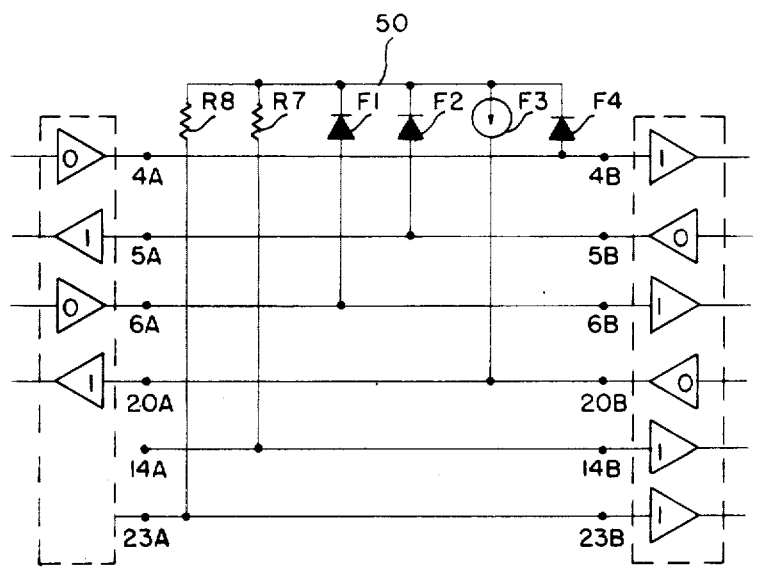
FIG. 12B is an equivalent circuit diagram of the apparatus of FIG. 12A showing operation of the apparatus with open inputs on two signal lines, enable signals on three signal lines, and a disable signal on one signal line.

In FIG. 12B, an equivalent circuit corresponding to FIG. 12A is illustrated, but with the FET F3 being biased for operation as a current source as the result of a disable handshake signal, assumed for purposes of description to be a low-voltage signal of +15 volts, on the signal line 20B. The other three FETs F1, F2 and F4 remain biased for operation as diodes as a result of enable signals on their respective signal lines, and continue to supply an enable signal to signal lines 14B and 23B, as discussed above. It is noted that while the interface cable assembly 10 of the present invention provides missing enable signals on signal lines with open inputs, such as the signal lines 14B and 23B, it does not override disable signals on handshake or control signal lines, such as just described for the signal line 20B. Consequently, the computer and peripheral device 12 and 14 continue to command operation through their various handshake and control signals, while the interface cable assembly supplies an enable signal only to those signal lines with open inputs.

In addition, it should be noted that while one handshake or control signal line may momentarily provide an inhibit signal, it does not transfer the signal to the signal lines with open inputs and cause them to change voltage states so long as at least one handshake line using a current-regulating FET provides an enable signal. Furthermore, when a disable voltage is present on a handshake line using a current-regulating FET, the current drain on the enable signal is minimal as a result of the current limiter characteristics of the FET when biased for operation as a current source.

Even after the switch 32 has been properly positioned, one or both of the computer 12 or the peripheral device 14 may disable data transfer by transmission of a disable signal on a handshake signal line (which, as noted above, will not be overridden by the interface cable assembly). For diagnostic purposes, the second embodiment of the invention utilizes the signal "D" indicator light 46 to indicate status and to determine which equipment is disabling data transfer. The light 46 is shown in FIG. 3 as part of the circuitry 48, and comprises a light-emitting diode connected by its anode to the internal ground present on signal line 7, and connected by its cathode through a resistor R17 to the anode of six standard diodes D1–D6. Each of the diodes D1–D6 has its cathode connected to one of signal lines 8A, 12A, 4A, 5A, 6A and 20A, respectively. The diodes D1–D6 are connected to the primary handshake signal lines, including the RTS, CTS, DSR and DTR handshake lines mentioned before, and the signal lines 8 and 12, usually designated as the CD (carrier detect) and SCD (secondary carrier detect) handshake lines.

When used for diagnostics, the interface cable assembly 10 is connected by either the first or second connectors 20 or 26 to one of the computer or peripheral device connectors 22 or 28, but not both. If enable signals (+15 volts) or open inputs (zero volts) are on all the signal lines to which the diodes D1–D6 are connected, the diodes will not be forward biased for current flow through the light-emitting diode comprising the "D" indicator light 46, and the light will not be illuminated. This indicates that the equipment to which the interface cable assembly 10 is connected is not disabling data transfer, since either an enable signal or an open input which will be provided with enable signals by the interface cable assembly is present on the handshake signal lines. If, however, when the interface cable assembly 10 is connected to the other of the computer or peripheral device connectors, again not on both, and there is a disable signal (−15 volts) on one of the signal lines to which the diodes D5–D10 are connected, the "D" indicator light 46 will be illuminated, indicating that the equipment is disabling operation. The various switches and parameters of the equipment may now be set, or the equipment debugged; and when the "D" indicator light 46 turns off, it indicates that the equipment is in condition or data transfer. At that time, the interface cable assembly 10 should be connected back up to both the computer and peripheral device connectors 22 and 28.

Figure 4:
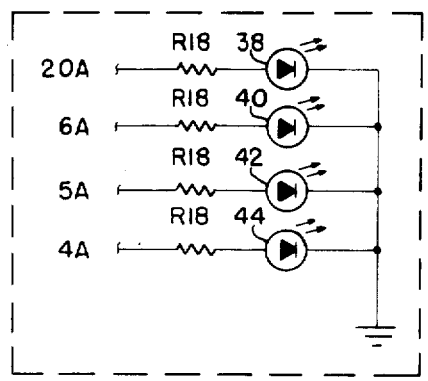
FIG. 4 is a schematic diagram of an alternative embodiment of the indicator lights used in the apparatus of FIG. 1.

The first embodiment of the invention uses as an alternative to the diagnostic "D" indicator light 46 the four status indicator lights 38–44 shown in FIG. 4. The status indicator lights 38–44 are comprised of four light-emitting diodes connected by their cathodes to the external ground present on signal line 7, and each connected by its anode through a resistor R18 to one of the signal lines 20A, 6A, 5A, and 4A. In this embodiment, an enable signal on one of the signal lines to which one of the indicator lights 38–44 is connected will cause conduction of current through the light-emitting diode comprising the light and its illumination. If a light is not illuminated, it identifies specifically which of the handshake signal lines is disabling data transfer.

In the presently preferred embodiment of the invention, conventional components are employed throughout. The resistance value used for resistors R1–R18 is 3.9 k-ohms.

From the foregoing, it will be appreciated that the invention, as described herein for purposes of illustration, provides an interface cable assembly which will interconnect for proper functioning computers and peripheral devices with external connectors having mismatched data signal lines and open inputs on handshake and control signal lines. The apparatus is inexpensive in construction, easy to use, requires no external power to operate, and provides means to assist the user in the proper use of the apparatus and preparing the computer and peripheral device for interconnection. It will also be appreciated that, although specific embodiments of the invention have been described herein for purposes of illustration, various modifications may be made without departing from the spirit and scope of the invention. Accordingly, the invention is not limited except as by the appended claims.

I claim:

1. An interface apparatus for interconnecting computers and peripheral devices with external connectors having mismatched data signal lines or open inputs on handshake or control signal lines, comprising:

means for electrically interconnecting a pair of designated data signal lines of a first computer or peripheral device connector with a pair of designated data signal lines of a second computer or peripheral device connector;

detection means for detecting mismatching interconnections of said pairs of data signal lines;

switching means responsive to a detected mismatch by said detection means for selectively reversing the electrical interconnection of said pairs of data signal lines;

interconnecting means for electrically interconnecting a plurality of designated handshake and control signal lines of said first connector with a plurality of designated handshake and control signal lines of said second connector; and means for detecting an enable signal on at least one of said designated handshake or control lines of said first or second connectors and detecting an open input on any other of said designated handshake or control signal lines of said first or second connectors, and in response to said detected enable signal supplying a non-linear current-limited enable signal to one or more of said other handshake or control signal lines detected as having an open input.

2. An interface apparatus for interconnecting computers and peripheral devices with external connectors having mismatched data signal lines or open inputs on handshake or control signal lines, comprising:

means for electrically interconnecting a pair of designated data signal lines of a first computer or peripheral device connector with a pair of designated data signal lines of a second computer or peripheral device connector;

detection means for detecting mismatching interconnections of said pairs of data signal lines;

switching means for selectively reversing the electrical interconnection of said pairs of data signal lines when a mismatch is detected by said detection means;

interconnecting means for electrically interconnecting a plurality of designated handshake and control signal lines of said first connector with a plurality of designated handshake and control signal lines of said second connector; and enabling means for detecting an enable signal on any one of a first plurality of preselected lines of said plurality of interconnected handshake or control signal lines and in response to said detected enable signal interconnecting at least one of said first preselected lines detected as having an enable signal to one or more of the other of said interconnected handshake or control signal lines with a open input and supplying a current-limited enable signal thereto to provide a functioning interface between said first computer or peripheral device connector and said second computer or peripheral device connector even when their respective handshake and control lines are interconnected by said interconnecting means so as to produce open inputs on one or more of said handshake or control signal lines needing an input to produce a functioning interface, said current-limited enable signal being of substantially constant current and substantially independent of the voltage of said enable signal within a predetermined range of voltages.

3. The apparatus of claim 2 wherein said enabling means includes a plurality of control means for supplying said current-limited enable signal, said control means each being electrically connected to at least one other of said control means and also being electrically connected to one of said first plurality of preselected lines of said interconnected handshake or control signal lines, each of said control means being responsive to the presence of an enable signal and an open input on the one of said first preselected lines to which it is connected, said control means having at least two operative states, in a first state being operative as a conductor of said enable signal if connected to one of said first preselected lines with an enable signal and conducting said enable signal to any others of said control means to which it is connected which are connected to one of said first preselected lines with an open input, and in a second state being operative as a current limiter if connected to one of said first preselected lines with an open input, whereby an enable signal on one of said first preselected lines will be conducted by its respective control means through the respective control means of another of said first preselected lines with an open input with a limited current drain on the enable signal.

4. The apparatus of claim 3 wherein each of said control means is electrically connected between a common node and one of said first preselected lines.

5. The apparatus of claim 4, further including a plurality of resistive conductors, each electrically interconnecting at least one of a second plurality of preselected lines of said interconnected handshake or control signal lines with at least one of said plurality of control means, wherein each of said plurality of resistive conductors is electrically connected between said common node and at least one of said second preselected lines of said interconnected handshake or control signal lines.

6. The apparatus of claim 3, further including a plurality of a resistive conductors, each electrically interconnecting one of a second plurality of preselected lines of said interconnected handshake or control signal lines with one of said plurality of control means, whereby if one of said second plurality of preselected lines has an open input, an enable signal on one of said first plurality of preselected lines is supplied through the one of said control means connected thereto through the resistive conductor to the one of said second plurality of preselected lines having the open input.

7. An interface apparatus for interconnecting computer and peripheral devices with external connectors having mismatched data signal lines or open inputs on handshake or control signal lines, comprising:

first connector means for electrical connection with the signal lines of a first computer or peripheral device connector;

second connector means for electrical connection with the signals lines of a second computer or peripheral device connector;

a pair of conductive paths extending between said first and second connector means, each path electrically interconnecting one designated data signal line of said first connector means with one designated data signal line of said second connector means;

a detector for detecting mismatching interconnections of said data signal lines;

a switch for selectively reversing the electrical interconnection of said data signal lines in response to said detector detecting mismatching interconnections of said data signal lines by altering said pair of conductive paths;

a plurality of additional conductive paths extending between said first and second connector means, each path electrically interconnecting at least one designated handshake or control signal line of said first connector means with at least one designated handshake or control signal line of said second connector means; and enabling means responsive to an enable signal on at least one of said additional conductive paths for supplying a current-limited enable signal on any other of said additional conductive paths having an open input on one of the handshake or control signal lines corresponding thereto, said current-limited enable signal being of substantially constant current and substantially independent of variations of the voltage of said enable signal, whereby mismatched data signal lines may be detected and properly matched, and handshake and control signal lines with open inputs may be supplied with enabling signals so as to provide a functioning interface between said external connectors.

8. The apparatus of claim 7 wherein said enabling means includes a plurality of control devices, each of said control devices being electrically connected between a common node and one of said additional conductive paths interconnecting designated handshake or control signal lines of said first and second connector means, and being operative as a conductor when an enable signal is present on one of its respective interconnected handshake or control signal lines and as a current limiter when an open input is present on one of its respective interconnected handshake or control signal lines, whereby an enable signal on one handshake or control signal line will supply the enable signal to another handshake or control signal line with an open input by the control device of the one line operating as a conductor with current flowing through the common node to the control device of the other line operating as a current limiter to reduce current drain on the enable signal.

9. The apparatus of claim 8 wherein said control devices include current-regulating field-effect transistors, each of said transistors being biased for operation as a diode when an enable signal is present on one of its respective interconnected handshake or control signal lines, and biased for operation as a substantially constant current source when an open input is present on one of its respective interconnected handshake or control signal lines.

10. The apparatus of claim 8, further including at least one resistive conductor electrically connected between said common node and another of said additional conductive paths interconnecting designated handshake or control signal lines of said first and second connector means, whereby an enable signal on one handshake or control signal line will also supply the enable signal through said resistive conductor to another handshake or control signal line with an open input by the control device of the one line operating as a conductor with current flowing through the common node to said resistive conductor.

11. The apparatus of claim 8, further including a plurality of resistive conductors, each of said resistive conductors being electrically connected between said common node and one other of said additional conductive paths interconnecting designated handshake or control signal lines of said first and second connector means.

12. The apparatus of claim 7, further including a switch for selectively reversing the electrical interconnection of a first pair of designated handshake or control signal lines of said first connector means with a corresponding second pair of designated handshake or control signal lines of said second connector means to correct mismatching interconnections of said first and second pairs of signal lines by altering said additional conductive paths interconnecting said first and second pairs of signal lines.

13. The apparatus of claim 12 wherein said switch for said first and second pairs of signal lines reverses the interconnection of said signal lines in response to said switch for said data signal lines reversing the interconnection of said data signal lines.

14. The apparatus of claim 7, further including indicator means for sensing and indicating the presence of an enable signal on at least one of a predetermined number of said handshake or control signal lines interconnected by one of said additional conductive paths.

15. The apparatus of claim 7, further including indicator means for sensing and indicating the presence of a disable signal on at least one of a predetermined number of said handshake or control signal lines interconnected by one of said additional conductive paths.

16. The apparatus of claim 7, further including means for visually indicating mismatching interconnection of said data signal lines.

17. An interface apparatus for interconnecting computers and peripheral devices with external connectors having mismatched data signal lines or open inputs on handshake or control signal lines, comprising:
  a first connector for electrical connection with the signal lines of a first computer or peripheral device connector;
  a second connector for electrical connection with the signal lines of a second computer or peripheral device connector;
  a first pair of conductive paths extending between said first and second connectors, one path of said first pair interconnecting a first signal line of said first connector with a first signal line of said second connector, and another path of said first pair interconnecting a second signal line of said first connector with a second signal line of said second connector;
  sensor means for sensing and indicating mismatched interconnections of said first and second signal line of said first and second connectors;
  first switching means for selectively interconnecting said first signal line of said first connector with said second signal line of said second connector, and interconnecting said second signal line of said first connector with said first signal line of said second connector by altering said first pair of conductive paths in response to said sensor means indicating mismatched interconnections of said first and second signal line of said first and second connectors;
  a second pair of conductor paths extending between said first and second connectors, one path of said second pair interconnecting a third signal line of said first connector with a third signal line of said second connector, and another path of said second pair interconnecting a fourth signal line of said first connector with a fourth signal line of said second connector;
  second switching means for selectively interconnecting said third signal line of said first connector with said fourth signal line of said second connector, and interconnecting said fourth signal line of said first connector with said third signal line of said second connector by altering said second pair of conductive paths;
  a third pair of conductive paths extending between said first and second connectors, one path of said third pair interconnecting a fifth signal line of said first connector with a fifth signal line of said second connector, and another path of said third pair interconnecting a sixth signal line of said first connector with a sixth signal line of said second connector;
  third switching means for selectively interconnecting said fifth signal line of said first connector with said sixth signal line of said second connector, and interconnecting said sixth signal line of said first connector with said fifth signal line of said second connector by altering said third pair of conductive paths; and first, second, third and fourth current-regulating field-effect transistors, each electrically connected between a common node and a different path of said second and third pairs of conductive paths, said path connections being made intermediate of said second and third switching means and one of said first or second connectors, each of said current-regulating field-effect transistors being connected to supply a current-limited enable signal to its respective path of said second and third pairs of conductive paths in response to an enable signal on at least one other path of said second and third pairs of conductive paths.

18. The apparatus of claim 17, further including a plurality of additional conductive paths extending between said first and second connectors, each additional path interconnecting at least one signal line of said first connector with at least one signal line of said second connector, and being electrically connected to said common node by a resistor.

19. An interface apparatus for interconnecting computers and peripheral devices with RS-232 external connectors having mismatched data signal lines or open inputs on handshake or control signal lines, comprising:
first connector means for electrical connection with the signal lines of a first computer or peripheral device connector;
second connector means for electrical connection with the signal lines of a second computer or peripheral device connector;
a first pair of conductive paths extending between said first and second connector means, one path of said first pair interconnecting respective number 2 signal lines and another path of said first pair interconnecting respective number 3 signal lines of said first and second connector means;
sensor means for sensing and indicating mismatched interconnections of said number 2 and number 3 signal lines;
first switching means for selectively interconnecting said number 2 signal line of said first connector means with said number 3 signal line of said second connector means, and interconnecting said number 3 signal line of said first connector means with said number 2 signal line of said second connector means by altering said first pair of conductive paths;
a second pair of conductor paths extending between said first and second connector means, one path of said second pair interconnecting respective number 4 signal lines and another path of said second pair interconnecting respective number 5 signal lines of said first and second connector means;
second switching means for selectively interconnecting said number 4 signal line of said first connector means with said number 5 signaline of said second connector means, and interconnecting said number 5 signal line of said first connector means with said numer 4 signal line of said second connector means for altering said second pair of conductive paths;
a third pair of conductive paths extending between said first and second connector means, one path of said third pair interconnecting respective number 6 signal lines and another path of said third pair interconnecting respective number 20 signal lines of said first and second connector means;
third switching means for selectively interconnecting said number 6 signal line of said first connector means with said number 20 signal line of said second connector means, and interconnecting said number 20 signal line of said first connector means with said number 6 signal line of said second connector means by altering said third pair of conductive paths; and first, second, third and fourth current-regulating field-effect transistors, each electrically connected between a common node and a different path of said second and third pairs of conductive paths, said path connections being made intermediate of said second and third switching means and one of said first or second connector means, each of said current-regulating field-effect transistors being connected to supply a current-limited enable signal to its respective path of said second and third pairs of conductive paths in response to an enable signal on at least one other path of said second and third pairs of conductive paths.

20. The apparatus of claim 19 wheren said number 4, 11 and 19 signal lines of said first connector means are electrically interconnected, and said number 4, 11 and 19 signal lines of said second connector means are electrically interconnected.

21. The apparatus of claim 19, further including a plurality of additional conductive paths extending between said first and second connector means, comprising a first path interconnecting respective number 1 signal lines, a second path interconnecting respective number 7 signal lines, a third path interconnecting respective number 8 signal lines, a fourth path interconnecting respective number 9 signal lines, a fifth path interconnecting respective number 10 signal lines, a sixth path interconnecting respective number 12 signal lines, a seventh path interconnecting respective number 13 signal lines, an eighth path interconnecting respective number 14 signal lines, a ninth path interconnecting respective number 15 signal lines, a tenth path interconnecting respective number 16 signal lines, an eleventh path interconnecting respective number 17 signal lines, a twelfth path interconnecting respective number 18 signal lines, a thirteenth path interconnecting respective number 21 signal lines, a fourteenth path interconnecting respective number 22 signal lines, a fifteenth path interconnecting respective number 23 signal lines, a sixteenth path interconnecting respective number 24 signal lines, and a seventeenth path interconnecting respective number 25 signal lines of said first and second connector means; and
first through fifteenth resistors, each electrically connected between said common node and a different path of said third through seventeenth paths.

22. An interface apparatus for interconnecting computers and peripheral devices with external connectors having open inputs on handshake or control signal lines, comprising:
interconnecting means for electrically interconnecting a plurality of designated handshake and control signal lines of a first computer or peripheral device connector with a plurality of designated handshake and control signal lines of a second computer or peripheral device connector; and
means for detecting an enable signal on at least one of said designated handshake or control signal lines of said first or second connectors and detecting an open input on any other of said designated handshake or control signal lines of said first or second connectors, and in response to said detected enable signal supplying a non-linear current-limited enable signal to one or more of said other handshake or control signal lines detected as having an open input.

23. An interface apparatus for interconnecting computers and peripheral devices with external connectors having open inputs on handshake or control signal lines, comprising:

interconnecting means for electrically interconnecting a plurality of designated handshake and control signal lines of a first computer or peripheral device connector with a plurality of designated handshake and control signal lines of a second computer or peripheral device connector; and enabling means for detecting an enable signal on any one of a plurality of first preselected lines of said plurality of interconnected handshake or control signal lines and in response to said detected enable signal interconnecting at least one of said first preselected lines detected as having an enable signal to one or more of the other of said interconnected handshake or control signal lines with a open input and supplying a current-limited enable signal thereto to provide a functioning interface between said first computer or peripheral device connector and said second computer or peripheral device connector even when their respective handshake and control lines are interconnected by said interconnecting means so as to produce open inputs on one or more of said handshake or control signal lines needing an input to produce a functioning interface, said current-limited enable signal being of substantially constant current and substantially independent of the voltage of said enable signal within a predetermined range of voltages.

24. The apparatus of claim 23 wherein said enabling means includes a plurality of control means for supplying said current-limited enable signal, said control means each being electrically connected to at least one other of said control means and also being electrically connected to one of said first plurality of preselected lines of said interconnected handshake or control signal lines, each of said control means being responsive to the presence of an enable signal and an open input on one of said preselected lines to which it is connected, said control means having at least two operative states, in a first state being operative as a conductor of said enable signal if connected to one of said first preselected lines with an enable signal and conducting said enable signal to any others of said control means to which it is connected which are connected to one of said first preselected lines with an open input, and in a second state being operative as a current limiter if connected to one of said first preselected lines with an open input, whereby an enable signal on one of said first preselected will be conducted by its respective control means through the respective control means of another of said first preselected lines with an open input with a limited current drain on the enable signal.

25. The apparatus of claim 24 wherein each of said control means is electrically connected between a common node and one of said first preselected lines.

26. The apparatus of claim 25, further including a plurality of resistive conductors, each electrically interconnecting at least one of a second plurality of said preselected interconnected handshake or control signal lines with at least one of said plurality of control means, and wherein each of said plurality of resistive conductors is electrically connected between said common node and at least one of said second plurality of preselected interconnected handshake or control signal lines.

27. The apparatus of claim 24, further including a plurality of a resistive conductors, each electrically interconnecting one of a second plurality of preselected lines of said interconnected handshake or control signal lines with one of said plurality of control means, whereby if one of said second plurality of preselected lines has an open input, an enable signal on one of said first plurality of preselected lines is supplied through the one of said control means connected thereto through the resistive conductor to the one of said second plurality of preselected predetermined number of said handshake or control signal lines having the open input.

28. An interface apparatus for interconnecting computers and peripheral devices with external connectors having open inputs on handshake or control signal lines, comprising:

first connector means for electrical connection with the signal lines of a first computer or peripheral device external conductor;

second connector means for electrical connection with the signals lines of a second computer or peripheral device external connector;

a plurality of conductive paths extending between said first and second connector means, each path electrically interconnecting at least one designated handshake or control signal line of said first connector means with at least one designated handshake or control signal line of said second connector means; and enabling means responsive to an enable signal on at least one of said conductive paths for supplying a current-limited enable signal on any other of said conductive paths having an open input on one of the handshake or control signal lines corresponding thereto, said current-limited enable signal being of substantially constant current and substantially independent of variations of the voltage of said enable signal, whereby open inputs on handshake and control signal lines are supplied with enabling signals so as to provide a function interface between said external connectors.

29. The apparatus of claim 28 wherein said enabling means includes a plurality of control devices, each of said control devices being electrically connected between a common node and one of said conductive paths interconnectng designated handshake or control signal lines of said first and second connector means, and being operative as a conductor when an enable signal is present on one of its respective interconnected handshake or control signal lines and as a current limiter when an open input is present on one of its respective interconnected handshake or control signal lines, whereby an enable signal on one handshake or control signal line will supply the enable signal to another handshake or control signal line with an open input by the control device of the one line operating as a conductor with current flowing through the common node to the control device of the other line operating as a current limiter to reduce current drain on the enable signal.

30. The apparatus of claim 29 wherein said control devices include current-regulating field-effect transistors, each of said transistors being biased for operation as a diode when an enable signal is present on one of its respective interconnected handshake or control signal lines, and biased for operation as a substantially constant current source when an open input is present on one of its respective interconnected handshake or control signal lines.

31. The apparatus of claim 29, further including at least one resistive conductor electrically connected between said common node and another of said conductive paths interconnecting designated handshake or control signal lines of said first and second connector means, whereby an enable signal on one handshake or control signal line will also supply the enable signal through said resistive conductor to anothr handshake or control signal line with an open input by the control device of the one line operating as a conductor with current flowing through the common node to said resistive conductor.

32. The apparatus of claim 29, further including a plurality of resistive conductors, each of said resistive conductors being electrically connected between said common node and one other of said conductive paths interconnecting designated handshake or control signal lines of said first and second connector means.

33. The apparatus of claim 28, further including a switch for selectively reversing the electrical interconnection of a first pair of designated handshake or control signal lines of said first connector means with a corresponding second pair of designated handshake or control signal lines of said second connector means to correct mismatching interconnections of said first and second pairs of signal lines by altering said conductive paths interconnecting said first and second pairs of signal lines.

34. The apparatus of claim 28, further including indicator means for sensing and indicating the presence of an enable signal on at least one of a predetermined number of said handshake or control signal lines interconnected by one of said conductive paths.

35. The apparatus of claim 28, further including indicator means for sensing and indicating the presence of a disable signal on at least on of a predetermined number of said handshake or control signal lines interconnected by on of said conductive paths.

* * * * *